Patented Jan. 9, 1934

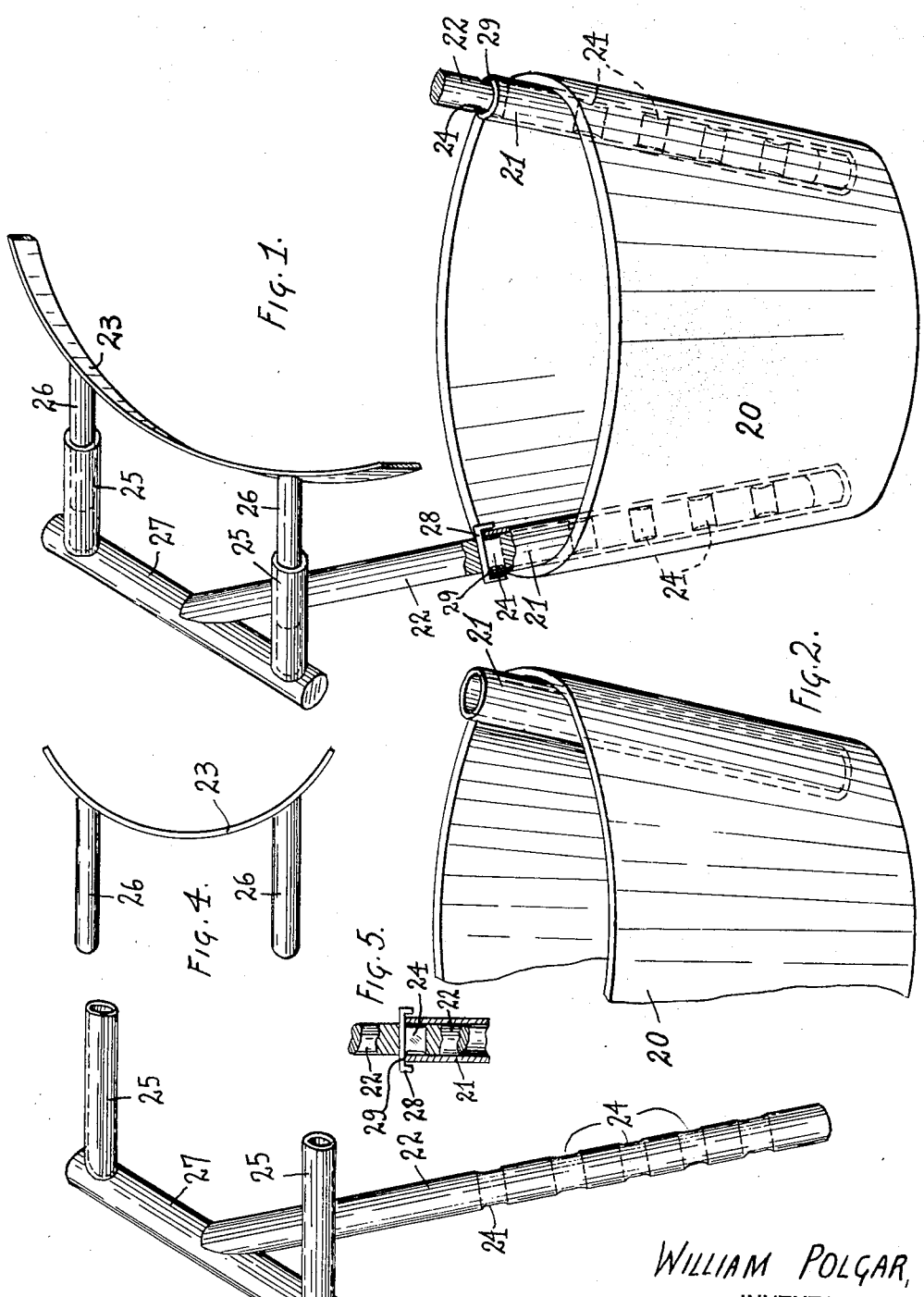

1,942,975

UNITED STATES PATENT OFFICE 1,942,975

PLANT POT AND SUPPORT

William Polgar, New York, N. Y.

Application January 18, 1933. Serial No. 652,354

2 Claims. (Cl. 47—47)

This invention relates to supports for growing plants, trees, flowers, particularly in combination with a pot or container for such plants, and the main object of this invention is to provide a device of this character which will keep the growing plant in a straight, upward position and aid it in obtaining and keeping an attractive and regular shape.

Another object of this invention is to provide a device of the mentioned character and for the purpose in view which will eliminate the pushing or embedding of sticks, rods or the like in the soil of the growing plant, thereby avoiding any harm to the root of the plant or to the soil in the pot thereof and also avoiding the bending of the plant or tree, of its taking up any irregular shape or confusion in its branches and the loosening of its soil.

Further objects of this invention will be apparent as the specification of the same proceeds, and among others, I may mention: To provide such a plant aiding, supporting and protecting device which will be formed of a combination of rods or similar elements adjustable to almost any case or condition met with such plants, which will be simple in construction, inexpensive to manufacture, efficient and easy to use, assemble, disassemble or adjust, and which will be durable.

In the drawing forming a part of this specification accompanying the same:

Fig. 1 is a somewhat diagrammatical perspective of my device;

Fig. 2 is a detailed diagrammatical perspective of a flower pot to which the base portions of my device have been applied.

Fig. 3 is another diagrammatical perspective showing one adjustable supporting rod of my device;

Fig. 4 is a diagrammatical plan view of the adjustable plant supporting member proper, Fig. 5 is a detailed diagrammatical perspective showing one means to secure the plant supporting rod in its adjusted position.

Referring now to the drawing more closely by characters of reference, the numeral 20 indicates a flower pot or like container for a growing plant, the soil and the plant usually placed therein having been removed. Two pipes or bases or tubes 21 are secured at opposite ends of a diameter of the pot 20 preferably on the circumferential wall thereof, and in each tube 21 a telescopically movable and adjustable tube or rod 22 is arranged in a generally vertical position. Each vertically adjustable and movable tube or rod 22 has a plurality of transversal holes or apertures 24 provided adjacent to its lower end, going through its material and a hook device 28 of the shape and form shown in Figs. 1 and 5 comprising a pin with transversal arms at its two ends may be passed through one of such holes 24 and then permitted to rest on the upper end 29 of the respective base or tube 21 thereby securing and supporting the adjustable tube or rod 22 in the desired position.

The upper end of each adjustable tube or rod 22 carries a cross piece 27 which is terminated by two inwardly projecting tubes 25. In each tube 25 a rod like element 26 may be slidably arranged, adapted to be moved inwardly or outwardly thereof and secured in any desired position by any means not shown but usual and well known in this art. The two adjustable members 26 carry on their inner ends secured thereon and thereto a preferably semi-circular protecting and supporting element proper 23.

The use and application of my device will be apparent from this description and from the inspection of the drawing. As the plant grows the tubes 22 may be adjusted in an upward direction, and similarly the supporting and embracing opposite members 23 may be moved inwardly or made to recede outwardly according to the requirements of the situation and my device will provide a simple means to keep the plant or the portion thereof which it is desired to protect and shape in a straight upward position and even somewhat with the contour desired.

Changes and variations may be made in the construction of the parts within the limits of the claims without departing from the spirit and scope of the invention.

I claim:

1. In a pot for growing plants, a plurality of substantially vertical pipes secured to the pot; an upwardly and downwardly adjustable rod in each of said vertical pipes; a cross member on each upwardly and downwardly adjustable rod; substantially horizontal transverse tubes secured to said cross member; adjustable horizontal elements in said transverse tubes, and a curved embracing member secured to said adjustable horizontal elements, its concave side being turned toward the growing plant.

2. In a pot for growing plants and the like, a substantially vertical receiving member secured in the pot; a rod in said receiving member adjustably slidable therein in an upward or downward direction; horizontally adjustable elements on said rod, and means secured at the end of said horizontally adjustable elements adapted to engage a growing plant in the pot; a plurality of transversal holes adjacent to the lower end of said rod, and a removable hook device adapted to pass through a desired hold and engage said receiving member so as to secure said rod in its position, said hook device comprising a pin with transversal arms at its two ends.

WILLIAM POLGAR.